United States Patent
Honda

(10) Patent No.: US 8,498,028 B2
(45) Date of Patent: Jul. 30, 2013

(54) IMAGE SCANNING APPARATUS, COMPUTER READABLE MEDIUM, AND IMAGE SCANNING METHOD

(75) Inventor: Keiji Honda, Ishikawa (JP)

(73) Assignee: PFU Limited, Ishikawa (JP)

( * ) Notice: Subject to any disclaimer, the term of this patent is extended or adjusted under 35 U.S.C. 154(b) by 0 days.

(21) Appl. No.: 13/150,883

(22) Filed: Jun. 1, 2011

(65) Prior Publication Data

US 2011/0228362 A1 Sep. 22, 2011

Related U.S. Application Data

(63) Continuation of application No. PCT/JP2008/003599, filed on Dec. 4, 2008.

(51) Int. Cl.
*H04N 1/46* (2006.01)
*H04N 1/32* (2006.01)
*G03F 3/08* (2006.01)
*G06K 9/00* (2006.01)

(52) U.S. Cl.
USPC ........... 358/505; 345/589; 358/462; 358/520; 382/167

(58) Field of Classification Search
None
See application file for complete search history.

(56) References Cited

U.S. PATENT DOCUMENTS

| 6,897,979 B1 * | 5/2005 | Mitsubori | 358/1.9 |
| 2004/0095594 A1 | 5/2004 | Moro | |
| 2004/0095605 A1 | 5/2004 | Moro | |
| 2005/0018267 A1 * | 1/2005 | Ando | 359/198 |
| 2006/0023943 A1 * | 2/2006 | Makino | 382/167 |

FOREIGN PATENT DOCUMENTS

| JP | 3241346 | 10/1991 |
| JP | 2003101725 A | 4/2003 |
| JP | 2003319189 A | 11/2003 |
| JP | 2004223358 | 8/2004 |
| JP | 2006287971 A | 10/2006 |
| JP | 2007258804 A | 10/2007 |

OTHER PUBLICATIONS

Japanese Office Action, Corresponding to JP2010-541146 mailed Feb. 7, 2013.

* cited by examiner

*Primary Examiner* — Marivelisse Santiago Cordero
*Assistant Examiner* — Moustapha Diaby
(74) *Attorney, Agent, or Firm* — Hogan Lovells US LLP

(57) ABSTRACT

There is provided an image scanning apparatus including: a plurality of image scanning unit that reads image information pieces of different colors at positions shifted from each other in one scanning direction or the other; a color image generation unit that generates color image information on the assumption that a plurality of the image information pieces read by the image scanning unit are the image information at the same position in the scanning direction; a black-and-white image generation unit that generates black-and-white image information on the assumption that the plurality of image information pieces read by the image scanning unit are the image information pieces at the positions different from each other in the scanning direction; and a selection unit that selects the color image information generated by the color image generation unit or the black-and-white image information generated by the black-and-white image generation unit as the image information to be employed, based on the read image information.

8 Claims, 12 Drawing Sheets

Fig. 6

| | | | R = G = B 0 / 255 | | | |
|---|---|---|---|---|---|---|
| W11 (R11) | W12 (R12) | W13 (R13) | W14 (R14) | W15 (R15) | W16 (R16) | |
| W21 (G11) | W22 (G12) | W23 (G13) | W24 (G14) | W25 (G15) | W26 (G16) | |
| W31 (B11) | W32 (B12) | W33 (B13) | W34 (B14) | W35 (B15) | W36 (B16) | |
| W41 (R21) | W42 (R22) | W43 (R23) | W44 (R24) | W45 (R25) | W46 (R26) | |
| W51 (G21) | W52 (G22) | W53 (G23) | W54 (G24) | W55 (G25) | W56 (G26) | |
| W61 (B21) | W62 (B22) | W63 (B23) | W64 (B24) | W65 (B25) | W66 (B26) | |
| W71 (R31) | W72 (R32) | W73 (R33) | W74 (R34) | W75 (R35) | W76 (R36) | |
| W81 (G31) | W82 (G32) | W83 (G33) | W84 (G34) | W85 (G35) | W86 (G36) | |
| W91 (B31) | W92 (B32) | W93 (B33) | W94 (B34) | W95 (B35) | W96 (B36) | |

Black-and-white data (top bracket)

Black-and-white image data

9 Image data

IMAGE SCANNING APPARATUS, COMPUTER READABLE MEDIUM, AND IMAGE SCANNING METHOD

CROSS-REFERENCE TO RELATED APPLICATIONS

This application is a continuation of International Application No. PCT/JP2008/003599, filed Dec. 4, 2008.

BACKGROUND OF THE INVENTION

Field of the Invention

The present invention relates to an image scanning method.

SUMMARY OF THE INVENTION

According to an aspect of the invention, there is provided an image scanning apparatus including: a plurality of image scanning unit that reads image information pieces of different colors at positions shifted from each other in one scanning direction or the other; a color image generation unit that generates color image information on the assumption that a plurality of the image information pieces read by the image scanning unit are the image information at the same position in the scanning direction; a black-and-white image generation unit that generates black-and-white image information on the assumption that the plurality of image information pieces read by the image scanning unit are the image information pieces at the positions different from each other in the scanning direction; and a selection unit that selects the color image information generated by the color image generation unit or the black-and-white image information generated by the black-and-white image generation unit as the image information to be employed, based on the read image information.

BRIEF DESCRIPTION OF THE DRAWINGS

Exemplary embodiments of the present invention will be described in detail based on the following figures, wherein:

FIG. 6 is an explanatory view showing black-and-white image data generated by a black-and-white image generation section 520;

DESCRIPTION OF THE PREFERRED EMBODIMENTS

System Constitution

First, the overall constitution of an image scanning system 1 will be described.

Figure 1:
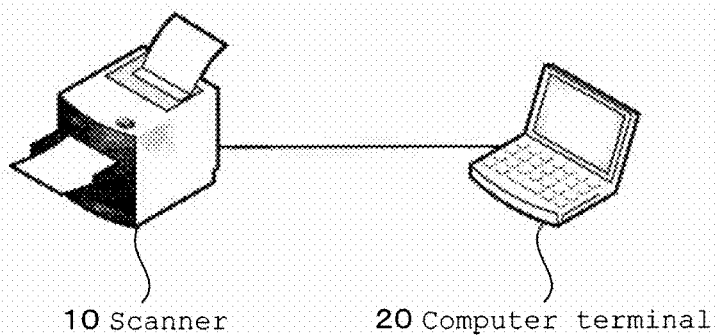
FIG. 1 is an explanatory diagram showing an overall constitution of an image scanning system 1.

FIG. 1 shows the overall constitution of the image scanning system 1 as an example.

As exemplified in FIG. 1, the image scanning system 1 comprises a scanner 10 and a computer terminal 20.

The scanner 10 is one example of the image scanner and scans an image shown in a sheet of manuscript.

The computer terminal 20 is a computer device operated by a user (operator). For example, in the user terminal 20, a driver program 5 (described later) is installed which is used to control the scanner 10. This permits the computer terminal 20 to control the scanner 10 and take in and edit image data read by the scanner 10. The computer terminal 20 is connected with the scanner 10 via a communication line such as a USB or a wireless LAN, for example.

Figure 2:
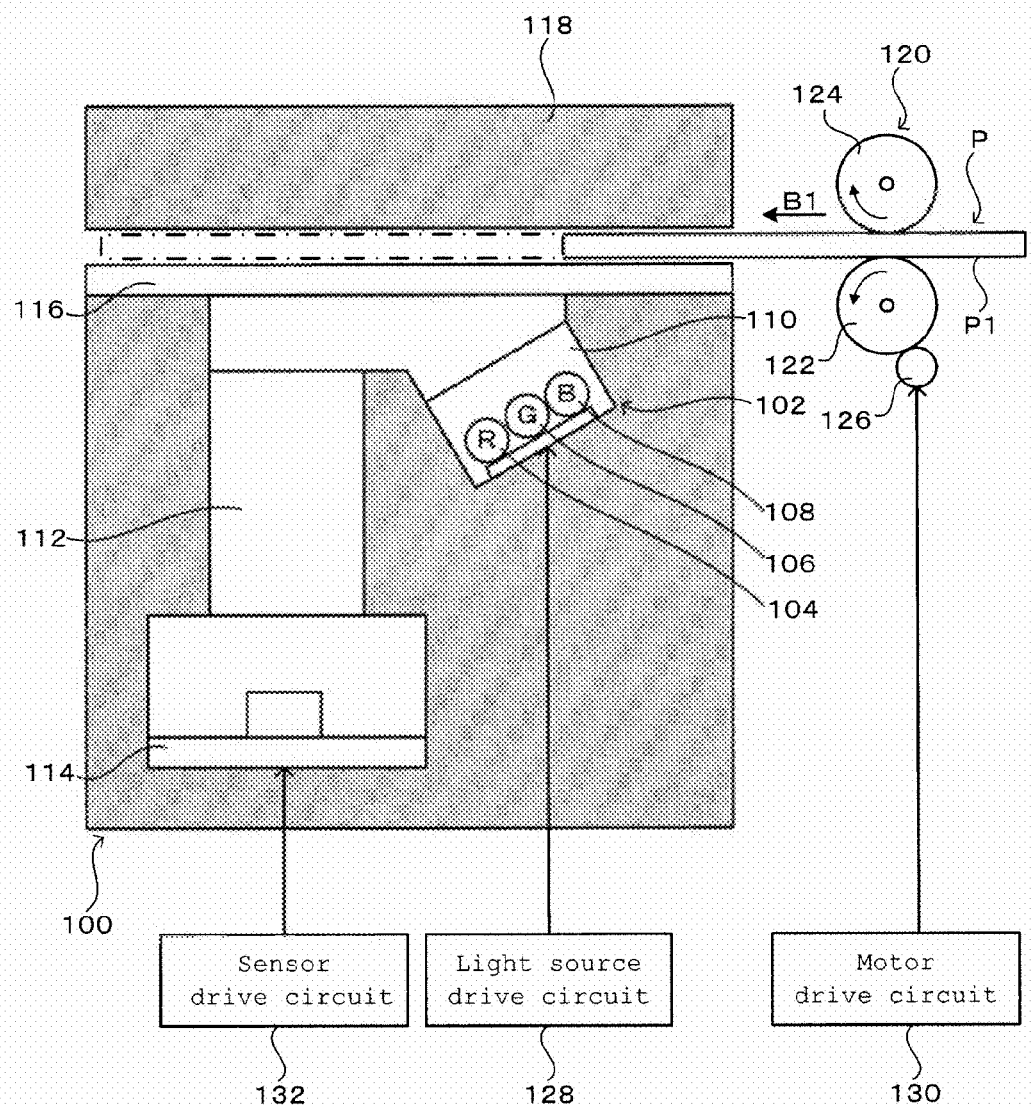
FIG. 2 is an explanatory diagram of an outline of a scanner 10.

FIG. 2 is an explanatory diagram of an outline of the scanner 10.

As exemplified in FIG. 2, the scanner 10 has an image sensor unit 100, a backing 118, a carrier device 120, a light source drive circuit 128, a motor drive circuit 130, and a sensor drive circuit 132. It is to be noted that in the present example, such a mode will be described as to scan an image from a print surface P1 of a sheet of manuscript P sent from the carrier device 120.

The image sensor unit 100 is used to scan an image from the print surface P1 of the manuscript P. In the present example, the image sensor unit 100 scans the manuscript P in a main scanning direction (fast scanning direction). The image sensor unit 100 is fixed to a frame (not shown) of the scanner 10. The image sensor unit 100 includes a light source unit 102, a lens 112, an image sensor 114, and a platen glass 116.

The light source unit 102 is used to irradiate the manuscript P with light. In the present example, the light source unit 102 includes an R-light source 104, a G-light source 106, and a B-light source 108, and a prism 110. The R-light source 104 emits red (R-color) light when turned on. The G-light source 106 emits green (G-color) light when turned on and the B-light source 108 emits blue (B-color) light when turned on. The R-light source 104, the G-light source 106, and the B-light source 108 (hereinafter referred to as "light sources 104-108" in some cases) are each constituted of an LED, for example. The light sources 104-108 are driven by the light source drive circuit 128. The light source drive circuit 128 turns on and off one of the light sources 104-108 at a time. Specifically, the light source drive circuit 128 sequentially turns on the light sources 104-108 one at a time in each line period based on a scan resolution for the manuscript P. That is, when having turned on, for example, the R-light source 104 once in a certain line period, the light source drive circuit 128 turns on the G-light source 106 once in the next line period and then turns on the B-light source 108 once in the further next line period. The prism 110 irradiates the manuscript P facing the image sensor unit 100 with lights emitted from the light sources 104-108 approximately equally in the main scanning direction (perpendicularly with respect to the paper of the present figure). That is, the lights emitted from the light sources 104-108 pass through the prism 110 and the platen glass 116 and are applied toward a main scanning directional region of the manuscript P that faces the image sensor unit 100.

The lens 112 makes the light reflected by the manuscript P incident upon the image sensor 114. The lens 112 includes, for example, a lot lens array and so permits the lights from the respective light sources 104-108 reflected by the print surface P of the manuscript P to pass through itself, thus causing an upright image of the print surface P1 to be displayed in the same size on a line sensor (not shown) of the image sensor 114. The lens 112 is disposed between the image sensor 114 and the platen glass 116.

The image sensor 114 is formed by arraying one line of sensor elements (not shown) linearly, in this example, in the main scanning direction of the manuscript P that faces the image sensor unit 100. For each exposure, the respective sensor elements generate element data pieces (image information pieces) in response to the lights (lights from the light sources 104-108 reflected by the print surface P1) incoming through the lens 112. For each exposure, the image sensor 114 generates line data made up of the element data pieces generated by the respective sensor elements. In such a manner, the image sensor 114 scans the manuscript P in the main scanning direction by using the sensor elements which are arrayed in one line linearly.

It is to be noted that the image sensor 114 is connected with the sensor drive circuit 132 and controlled by the sensor drive circuit 132 in driving. The sensor drive circuit 132 exposes the sensor elements of the image sensor 114 (not shown) to the lights when the light sources 104-108 are turned on. Therefore, those sensor elements generate element data pieces for the respective R-, G-, and B-colors, that is, R data, G data, and B data each time the light sources 104-108 are turned on. In such a manner, as exemplified in FIG. 3, the image sensor 114 generates line data pieces (that is, R line data, G line data, and B line data) composed of the element data pieces corresponding to the R-, G-, and B-colors respectively. It is to be noted that the image sensor 114 outputs the generated line data pieces to a control device (not shown). For example, when the R-light source 104 is turned on for the first time, the image sensor 114 generates R data pieces (R11, R12, R13, ... ), which are the element data pieces corresponding to the respective sensor elements, to generate RI line data made up of those R data pieces. Further, when the G-light source 106 is turned on for the first time, the image sensor 114 generates G data pieces (G11, G12, G13, ... ), which are the element data pieces corresponding to the respective sensor elements, to generate G1 line data made up of those G data pieces. Additionally, when the B-light source 108 is turned on for the first time, the image sensor 114 generates B data pieces (B11, B12, B13, ... ), which are the element data pieces corresponding to the respective sensor elements, to generate B1 line data made up of those B data pieces.

As shown in FIG. 2, the backing 118 cooperates with the platen glass 116 of an image sensor unit 2, to support the manuscript P (dash-and-dot line in FIG. 2) carried by the carrier device 120. The backing 118 is disposed to a position where it faces the image sensor unit 100 in a condition where the manuscript P is sandwiched between them. The surface of the backing 118 that faces the image sensor unit 100 is constituted of a white or black member.

The carrier device 120 is used to relatively move the manuscript P and the image sensor 114 of the image sensor unit 100, thereby implementing scanning in a sub-scanning direction (slow scanning direction). Specifically, the carrier device 120 includes two carrier rollers 122 and 124 facing each other and supported rotatably and a motor 126 that rotates the carrier roller 122. When the motor 126 rotates, the carrier roller 122 rotates in an arrow direction. As the carrier roller 122 rotates, the manuscript P is caught between the carrier rollers 122 and 124 and carried in a carriage direction indicated by an arrow B1. Therefore, the image sensor 114 can scan the print surface P1 of the manuscript P in the sub-scanning direction (slow scanning direction) by repeating main scanning directional scanning while the manuscript P is being moved by the carrier device 120 relatively to the image sensor 114 in the carrying direction. It is to be noted that rotation of the motor 126 is controlled in driving by the motor drive circuit 130. In the present example, the motor drive circuit 130 controls the rotation speed of the motor 126 so that the manuscript P may be carried at a speed specified by the driver program 5 (described later).

Thus, the scanner 10 of the present example reads image information pieces of the plurality of colors (R-, G-, and B-colors) at positions shifted from each other in the sub-scanning direction. That is, as exemplified in FIG. 3, a position to read R data (R line data read position), a position to read G data (G line data read position), and a position to read B data (B line data read position) are shifted from each other in the sub-scanning direction (slow scanning direction). In particular, those shifts are roughly equal in the scanner 10 of the present example. The sub-scanning directional shift may give rise to so-called a color shift at the edge portions of an image.

Figure 4:
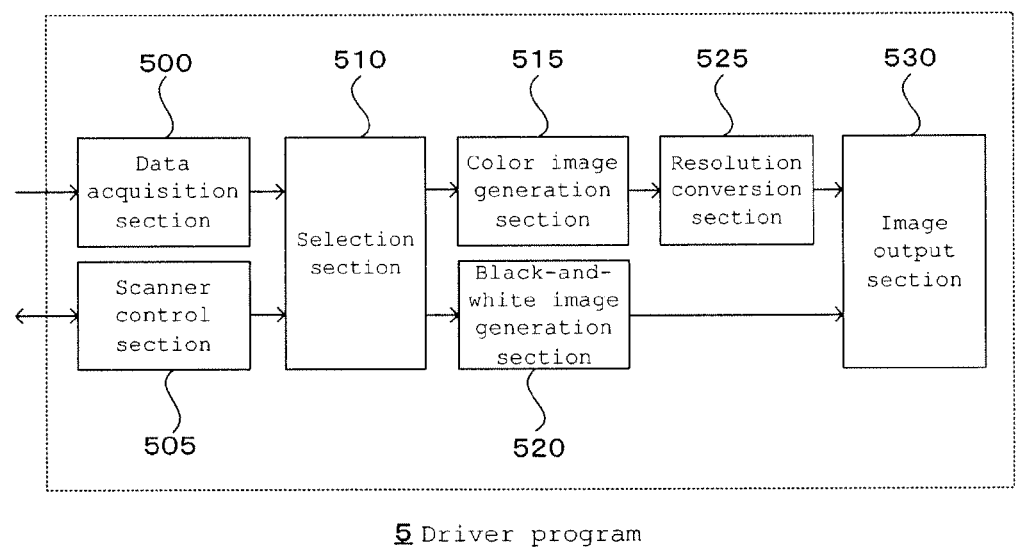
FIG. 4 is a diagram showing a functional configuration of a driver program 5 as an example.

FIG. 4 is a diagram showing a functional configuration of the driver program 5 as an example.

As exemplified in FIG. 4, the driver program 5 has a data acquisition section 500, a scanner control section 505, a selection section 510, a color image generation section 515, a black-and-white image generation section 520, a resolution conversion section 525, and an image output section 530.

The driver program 5 of the present example is recorded, for example, in a recording medium such as a CD-ROM, from which it is installed to the computer terminal 20 (FIG. 1). It is to be noted that the driver program 5 may be partially or totally installed to the computer terminal 20 via a network. Further, the driver program 5 may be partially or totally installed to the scanner 10 or realized by a hardware such as an ASIC in the scanner 10. For example, functions (described later) of the color image generation section 515 may be realized by a hardware in the scanner 10.

In the driver program 5, the data acquisition section 500 acquires image information (image data) read by the scanner 10 and outputs the acquired image information to the selection section 510.

Figure 3:
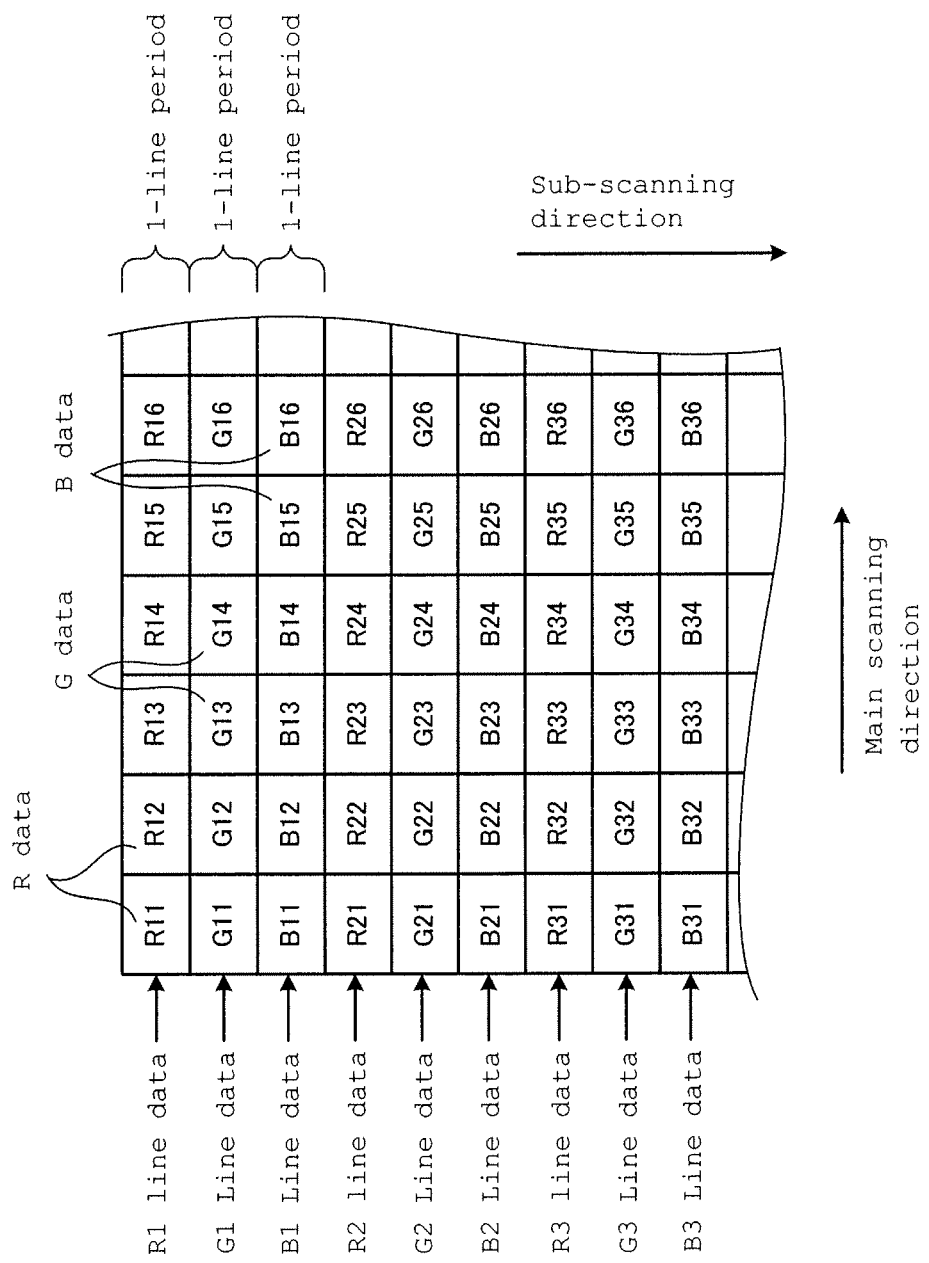
FIG. 3 is an explanatory view showing image information which is read by the scanner 10.

The data acquisition section 500 of the present example receives the image data exemplified in FIG. 3 from the scanner 10 via a USB cable.

The scanner control section 505 controls the scanner 10. For example, the scanner control section 505 commands the scanner 10 to start image scanning processing, set a specified read resolution in it, and color scanning/black-and-white scanning.

In response to an input by the user, the scanner control section 505 of the present example specifies a normal scanning mode or a high-speed scanning mode and commands the start of scan operations (scanning processing). In the high-speed scanning mode, the manuscript P is carried at a speed of the normal scanning mode multiplied by the number of the colors (three in the present example). That is, in the present example, when the high-speed scanning mode is specified, the carrying speed by the carrier device 120 becomes three-fold as compared to a case where the normal scanning mode is specified. In this case, the operation speed of the image sensor unit 100 remains unchanged, so that the number of times of scanning (resolution) in the sub-scanning direction in the high-speed scanning mode is reduced to one-third of that in the normal scanning mode.

The selection section 510 selects the color image generation section 515 or the black-and-white image generation section 520 based on the image data read by the scanner 10 and outputs the image data to whichever section is selected. For example, when having decided that an image region of interest is made up of black-and-white characters or line drawings as a result of analysis on the image data, the selection section 510 selects the black-and-white image generation section 520, and when having decided that the image region of interest is neither black nor white or made up of neither characters nor line drawings (for example, in the case of a blank region or a continuous-tone region), it selects the color image generation section 515. The line drawing here means a graphic or a table.

The selection section 510 of the present example determines, for each pixel, whether or not the values of R data, G data, and B data (R-, G-, and B-density values) read by the scanner 10 are all present in the vicinity of a maximum density value or a minimum density value (that is, whether or not they fall in a density range determined to be white or black), analyzes the concatenation state of a pixel whose R-, G-, and B-density values are all near the maximum or minimum density value, extracts a group of the pixels (concatenated pixels) that are concatenated with each other, and determines whether or not the extracted group of pixels (concatenated pixels) are a component of the black-and-white character or line drawing based on a size, a gravity, etc. of the extracted pixel group. Then, for the group of the pixels determined as a component of the black-and-white character or line drawing, the selection section 510 of the present example selects the black-and-white image generation section 520 and, for the other pixels, selects the color image generation section 515.

It is to be noted that when the high-speed scanning mode is specified, the selection section 510 of the present example selects the color image generation section 515 or the black-and-white image generation section 520 based on the results of analysis on the image data, and when the normal scanning mode is selected, it selects the color image generation section 515 without analyzing the image data.

The color image generation section 515 generates color image data on the assumption that the image data of a plurality of colors (image information of a plurality of color components) read by the scanner 10 is the image data (image information) at the same position. That is, the color image generation section 515 assigns image information of a plurality of colors read by the scanner 10 for each of the pixels on the assumption that this image information of the plurality of colors is free of shifts in the read position.

Figure 5:
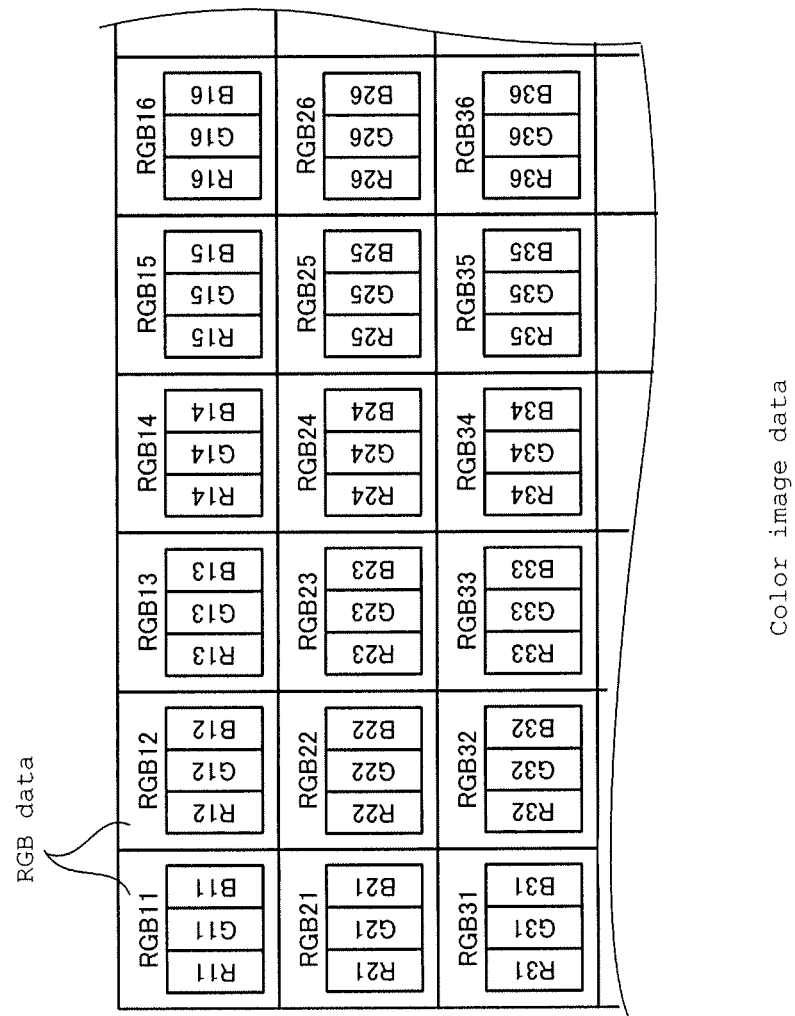
FIG. 5 is an explanatory view showing color image data generated by a color image generation section 515.

The color image generation section 515 of the present example combines R data, G data, and B data (exemplified in FIG. 3) which are shifted in the sub-scanning direction, into one piece of color image data of the pixel as exemplified in FIG. 5. That is, although the R11, G11, and B11 values are actually read at different positions on the manuscript P, the color image generation section 515 assumes that those values are one piece of color image data (RGB11). Similarly, R12, G12, and B12 are assumed to be one piece of color image data RGB12 of the pixel and R13, G13, and B13 are assumed to be one piece of color image data RGB13 of the pixel.

The black-and-white image generation section 520 generates black-and-white image data on the assumption that image data (image information of a plurality of color components) read by the scanner 10 is image information pieces at different positions from each other. That is, the black-and-white image generation section 520 converts each of the image data of a plurality of colors read by the scanner 10 into a monochromatic density value (tone value) and allocates the converted monochromatic density value corresponding to the shift in read position.

The black-and-white image generation section 520 of the present example assumes that the respective values of the sub-scanning directionally shifted R data, G data, and B data (exemplified in FIG. 3) are monochromatic density values and allocate them corresponding to the actual read positions as exemplified in FIG. 6. It is to be noted that monochromatic density values in the present example are composed of R data, G data, and B data of the same value. This triples the number of the sub-scanning directional pixels (resolution).

The resolution conversion section 525 performs resolution conversion processing on color image data generated by the color image generation section 515. The applicable resolution conversion processing may be, for example, a method for simply duplicating pixel values (RGB data), a method by use of interpolation such as the nearest interpolation method, etc.

Figure 7:
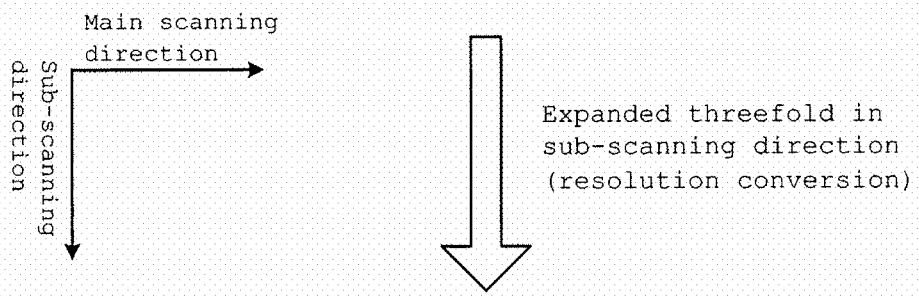
FIG. 7 is an explanatory view showing resolution conversion processing by a resolution conversion section 525 as an example.

When the high-speed scanning mode is specified, the resolution conversion section 525 of the present example performs resolution conversion which triples the sub-scanning directional resolution on color image data input from the color image generation section 515, and when the normal scanning mode is specified, outputs the input image data as it is to the image output section 530 without performing the resolution conversion processing. Since the image data (color image data) read in the high-speed scanning mode has a sub-scanning directional resolution which is one-third the main scanning directional resolution as exemplified in FIG. 7A, by performing sub-scanning directional resolution conversion, the main scanning directional resolution and the sub-scanning directional resolution match with each other as exemplified in FIG. 7B.

The image output section 530 integrates the image data input from the resolution conversion section 525 (color image data) and the image data generated by the black-and-white image generation section 520 and outputs the integrated image data to an image output device (for example, monitor or printer).

Figure 8:
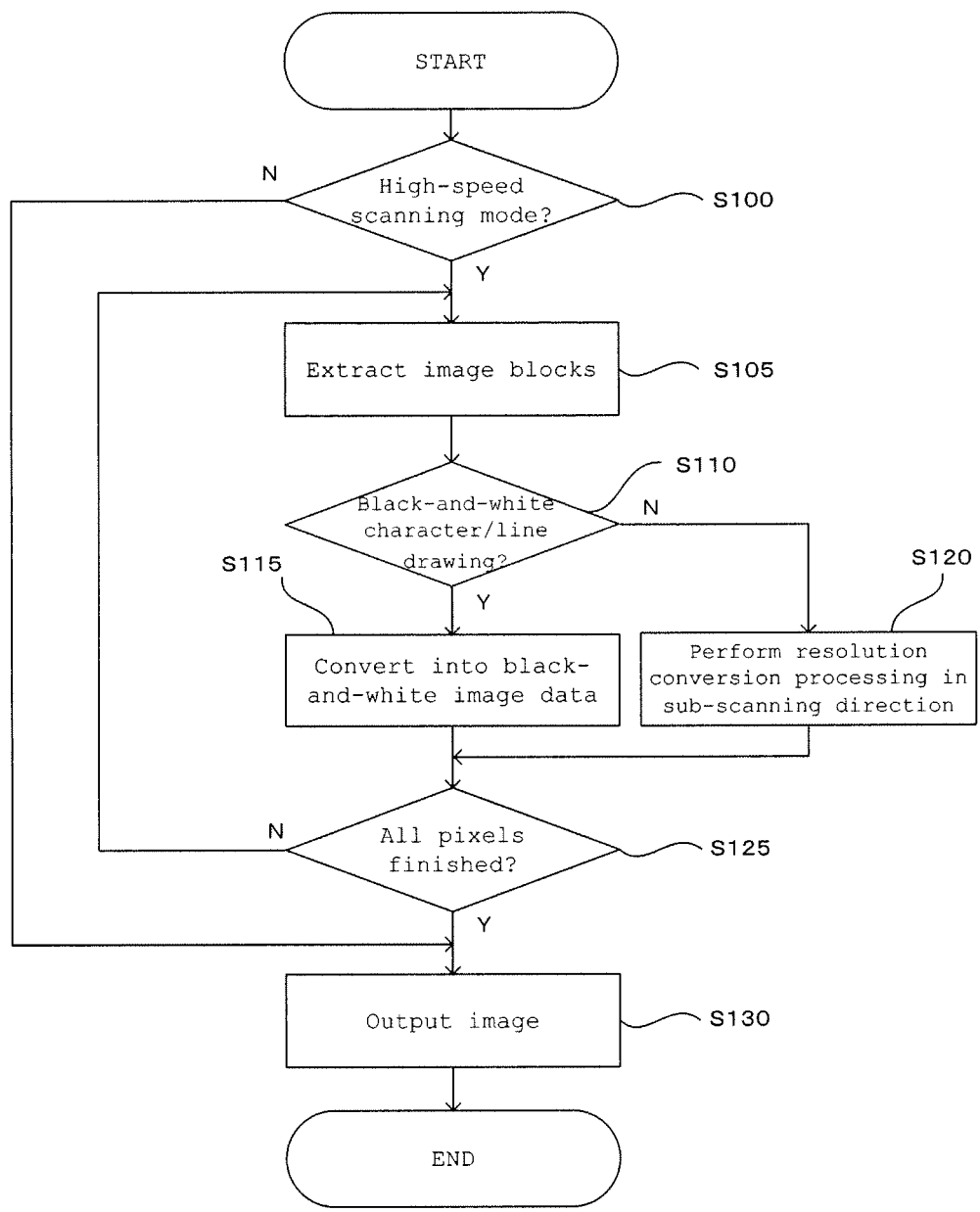
FIG. 8 is an explanatory flowchart of an operation of the driver program 5.

FIG. 8 is an explanatory flowchart of an operation (S10) of the computer terminal 20 (driver program 5).

As shown in FIG. 8, at step 100 (S100), the scanner control section 505 (FIG. 4) specified the high-speed scanning mode or the normal scanning mode in response to an input by the user and gives a command the scanner 10 to start scanning.

The scanner 10 scans the print surface P1 of the manuscript P at a speed corresponding to the scanning mode, so that the image data read by the scanner 10 is acquired by the data acquisition section 500.

When the high-speed scanning mode is specified, the driver program 5 shifts to processing of S105 and, when the normal scanning mode is specified, shifts to processing of S130.

At step 105 (S105), the selection section 510 sequentially extracts image blocks of a predetermined size from the image data (FIG. 3) acquired by the data acquisition section 500. Preferably, the size of the sub-scanning directional image blocks may be a multiple of three.

At step 110 (S110), when having determined whether or not the extracted image block is a component of black-and-white characters or line drawings and, when having determined it is such a component, the selection section 510 outputs the image data of this image block to the black-and-white image generation section 520 and, otherwise, outputs the image data to the color image generation section 515.

When it is determined that the image block is the component of black-and-white characters or line drawings, the driver program 5 shifts to processing of S115 and, when it is determined that the image block is not the component of black-and-white characters or line drawings, shifts to processing of S120.

At step 115 (S115), the black-and-white image generation section 520 converts the image data (some of the R data, G data, and B data exemplified in FIG. 3) of the image block input from the selection section 510 into the monochromatic image data. Specifically, the black-and-white image generation section 520 respectively converts the R data, G data, and B data exemplified in FIG. 3 into the monochromatic RGB data pieces (black-and-white image data pieces) exemplified in FIG. 6. Accordingly, for example, a density value of R11 is converted into RGB data (W11) that indicates a monochromatic density value corresponding to this density value. When the density value of R11 is 255, RGB data composed of R255, G255, and B255 is generated. Similarly, G11 in FIG. 3 is converted into W21 in FIG. 6, and B11 is converted into W31.

At step 120 (S120), the color image generation section 515 combines three sub-scanning directional image data pieces (R data, G data, and B) contained in the image data (R data, G data, and B data exemplified in FIG. 3) of the image block input from the selection section 5, into one piece of the RGB data (color image data). In such a manner, for example, R11, G11, and B11 in FIG. 3 are combined into one piece of the color image data (RGB11) exemplified in FIG. 5. Similarly, R12, G12, and B12 in FIG. 3 are combined into RGB12 in FIG. 5, and R13, G13, and B13 are combined into RGB13. It is to be noted that in a mode in which processing to package R data, G data, and B data into RGB data is performed in the scanner 10, the following resolution conversion processing is carried out as it is.

The resolution conversion section 525 performs the resolution conversion processing for tripling a sub-scanning directional resolution, on RGB data output from the color image generation section 515.

At step 125 (S125), the image output section 530 sequentially integrates an image block input from the black-and-white image generation section 520 and an image block input from the resolution conversion section 525.

The selection section 510 determines whether or not the image data is all extracted as the image blocks and, when any image region is yet to be extracted as an image block, returns to the processing of S105 to extract the next image block.

When the image data is all extracted as the image blocks, the driver program 5 shifts to processing of S130 and, otherwise, shifts to the processing of S105.

At step 130 (S130), the image output section 530 outputs the integrated image data to the monitor, etc.

As described above, in the image scanning system 1 of the present embodiment, when the high-speed scanning mode is selected, the scanner 10 performs high-speed scanning by carrying the manuscript P at a triple speed, so that image data read by the high-speed scanning is classified by the driver program 5 into image regions that correspond to black-and-white characters or line drawings and the other image regions. Furthermore, the driver program 5 respectively converts R data, G data, and B data in the image regions corresponding to the black-and-white characters or line drawings into image data pieces of the black-and-white pixel and allocates the black-and-white image data pieces corresponding to the read positions. On the other hand, for the image regions other than the image regions corresponding to the black-and-white characters or line drawings, the driver program 5 performs the resolution conversion processing which triples the sub-scanning directional resolution on color image data composed of the R data, G data, and B data. With this, it can be expected to speed up the scanning processing and suppress color shifts from occurring at the edge portions.

[Variant 1]

Next, variant 1 of the above embodiment will be described below. As described with reference to the embodiment, image data read by the scanner 10 in the high-speed scanning mode can be considered also to have been compressed before the resolution conversion processing. Therefore, variant 1 will be described with reference to a mode in which image data read in the high-speed scanning mode is stored or transmitted as compressed data as it is and undergoes the resolution conversion processing immediately before image output such as display or print-out.

Figure 9:
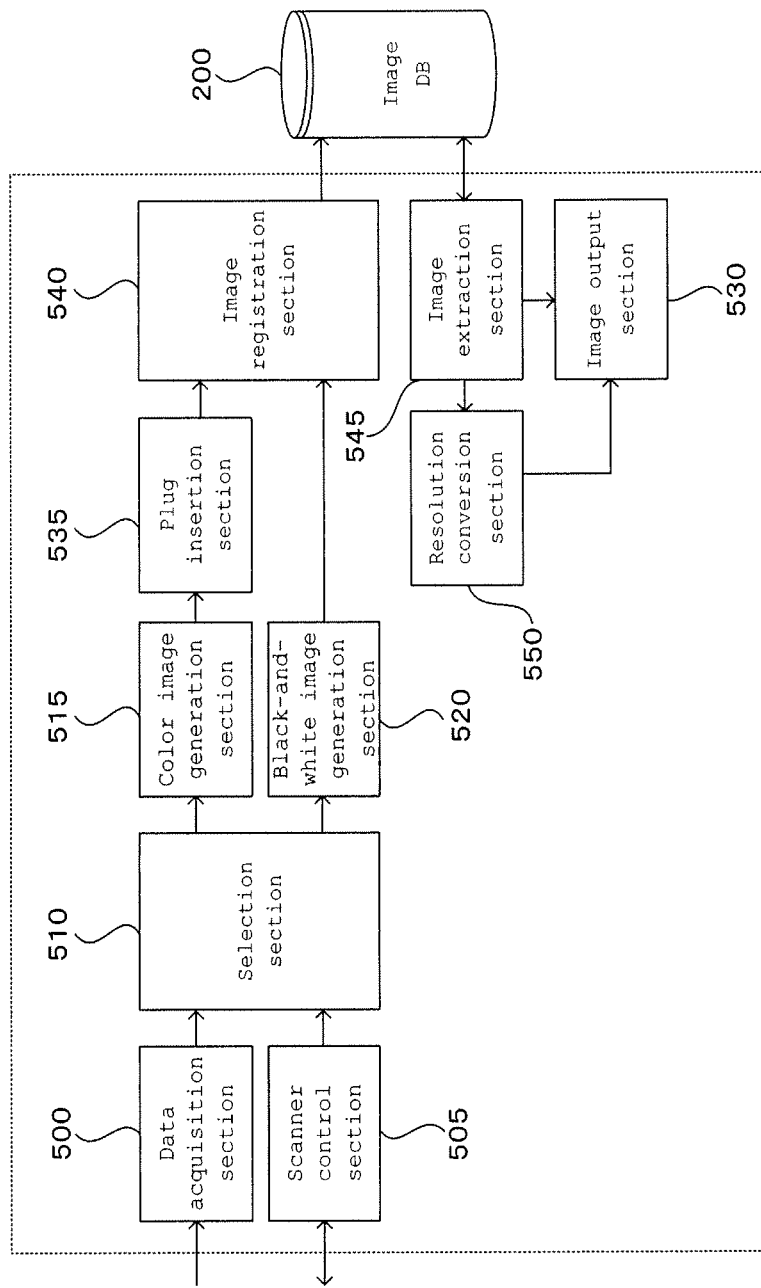
FIG. 9 is a diagram showing a functional configuration of a second driver program 52.

FIG. 9 is a diagram showing the functional configuration of a driver program 52 in variant 1 as an example. It is to be noted that identical reference numerals are given to the essentially identical components in FIGS. 4 and 9.

As exemplified in FIG. 9, the second driver program 52 has a configuration that has replaced the resolution conversion section 525 in the driver program 5 of FIG. 4 with a flag insertion section 535 and added an image registration section 540, an image extraction section 545, and a second resolution conversion section 550 to itself.

Figure 10:
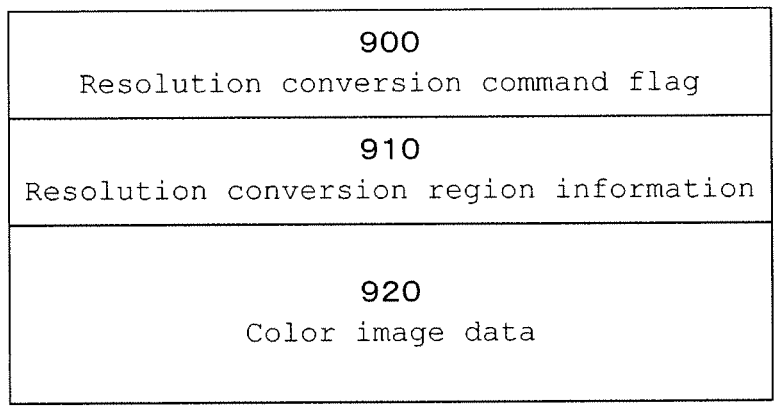
FIG. 10 is a diagram showing a data structure of image data 9.

The flag insertion section 535 adds to the image data a flag indicating that the sub-scanning directional resolution conversion needs to be performed on at least some of image data pieces and information indicating the range of an image region subject to resolution conversion (or information indicating the range of an image region in which the color image data is converted into the black-and-white image data). For example, as exemplified in FIG. 10, to color image data 920 read in the high-speed scanning mode, the flag insertion section 535 adds a resolution conversion command flag 900 indicating that threefold resolution conversion is necessary in the sub-scanning direction and a resolution conversion region information 910 indicating an image region on which resolution conversion should be performed.

It is to be noted that the resolution conversion command flag 900 and the resolution conversion region information 910 may be replaced with a code that gives commands directly to duplicate the pixel values (RGB values) of an immediately preceding pixel in the sub-scanning direction (that is, immediately superjacent pixel).

The image registration section 540 generates compressed image data 9 by integrating the color image data to which the resolution conversion command flag 900 and the resolution conversion region information 910 are added by the flag insertion section 535 and the black-and-white image data generated by the black-and-white image generation section 520 and stores the generated image data 9 in an image database (image DB) 200. The image DB 200 is a database formed in a storage region of the computer terminal 20.

The image extraction section 545 extracts the requested image data 9 from the image DB 200 in response to a request from the user and, when the resolution conversion command flag 900 is added to the extracted image data 9 (FIG. 10), classifies image data pieces contained in the image data 9 into the color image data and the black-and-white image data with reference to the resolution conversion region information 910, and outputs the classified color image data to the resolution conversion section 550 and the classified black-and-white image data to the image output section 530.

The resolution conversion section 550 extends the color image data input from the image extraction section 545 (that is, the image data of an image region indicated by the resolution conversion region information 910) in the sub-scanning direction. The resolution conversion section 550 of the present example expands the input color image data threefold in the sub-scanning direction.

The image output section 530 integrates the black-and-white image data input from the image extraction section 545 and the color image data input from the resolution conversion section 550 and outputs to the monitor, etc.

Thus, according to variant 1, by storing or transmitting the color image data before performing resolution conversion processing on the image data, it is possible to suppress the amount of the image data stored or transmitted. In other words, the image data can be compressed by cooperating with the scanner 10.

[Variant 2]

Next, variant 2 will be described below. In contrast to the above embodiment in which processing has all been performed in an RGB color space, variant 2 will be described with reference to a mode in which the processing is performed in a YCC color space (YCrCb color space).

Figure 11:
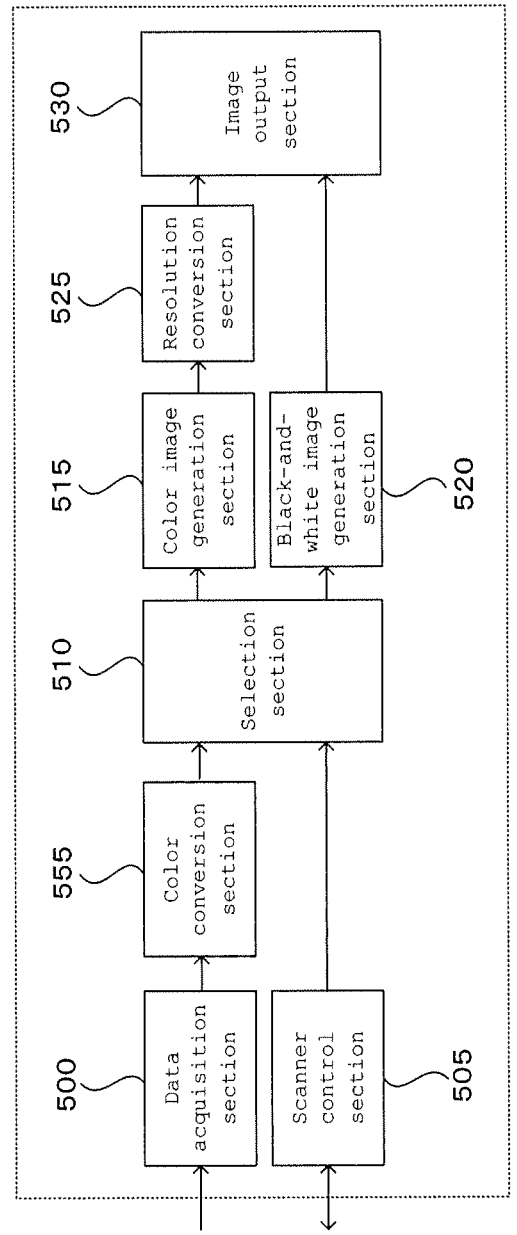
FIG. 11 is a diagram showing a functional configuration of a third driver program 54.

FIG. 11 is a diagram showing the functional configuration of a third driver program 54 as an example. It is to be noted that identical reference numerals are given to the essentially identical components in FIGS. 4 and 11.

As exemplified in FIG. 11, the third driver program 54 has a configuration that has added a color conversion section 555 to the driver program 5 of FIG. 4.

The color conversion section 555 converts the image data (RGB data) acquired by the data acquisition section 500 into image data in the YCbCr color space and outputs the converted image data to the selection section 510. This causes processing of the following stages to be performed in the YCbCr color space.

Thus, according to variant 2, image processing can be performed by paying attention to a Y-component, which has a large influence on the resolution. It is to be noted that since color conversion processing is added to the present variant, it has heavier processing load than the above embodiment.

[Other Variants]

Next, the other variants will be described below.

Figure 12:
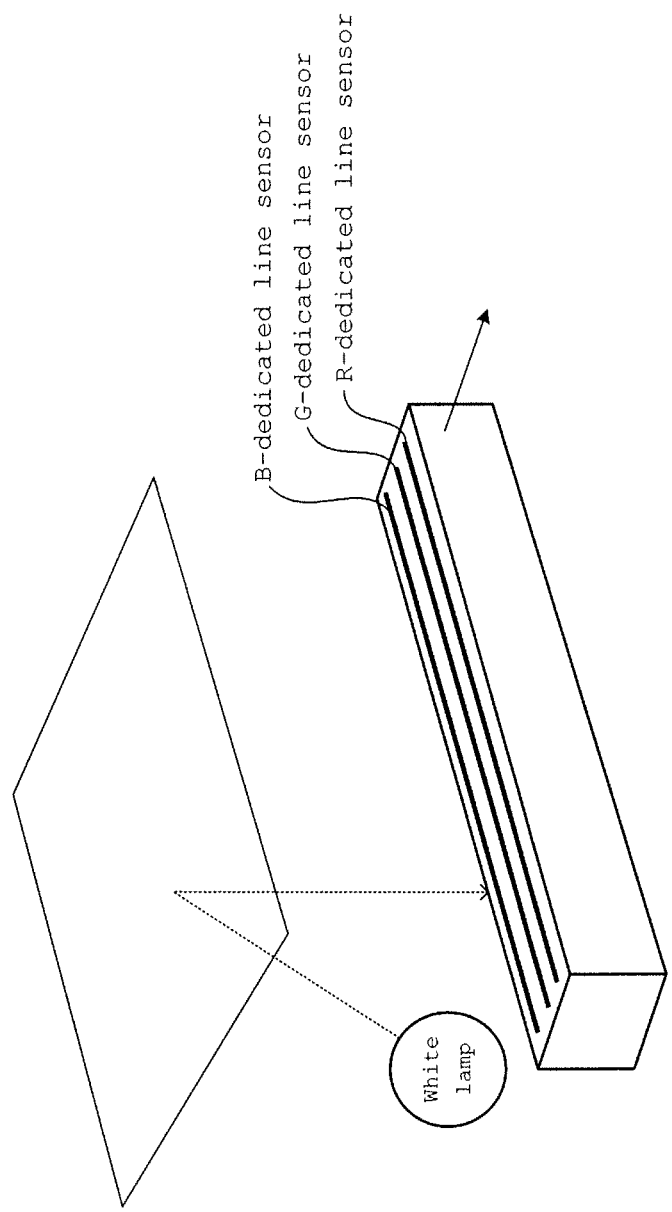
FIG. 12 is a diagram showing another mode of the image scanning unit.

Although in the above embodiment, the R-light source 104, the G-light source 106, and the B-light source 108 have been turned on sequentially and the single image sensor 114 has read the image information of each color at timing when each of the light sources is turned on, instead, as exemplified in FIG. 12, a plurality of the image sensors dedicated for the respective colors (R-dedicated line sensor, G-dedicated line sensor, and B-dedicated line sensor) may be arrayed in the sub-scanning direction so as to simultaneously read lights reflected by the manuscript P. In this case also, since the plurality of image sensors (line sensors) are shifted from each other in the sub-scanning direction, actual read positions of the plurality of the image sensors are shifted as in the case of the above embodiment. Therefore, the above driver program 5, etc. can be applied as they are.

Although the above embodiment and variants have been based on the assumption that images are scanned by the scanner 10, the present invention is not limited to it; for example, the present invention can be applied similarly to the case of scanning images with a facsimile or a copy machine.

Further, although the above embodiment and variants have been described with reference to the mode in which the read positions for the respective colors are shifted in the sub-scanning direction as a concrete example, the present invention can be applied similarly to a case where those read positions for the respective colors are shifted in the main scanning direction by changing the resolution conversion direction to the main scanning direction.

INDUSTRIAL APPLICABILITY

The present invention can be applied to an image scanning system that incorporates a scanner, etc.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image scanning apparatus comprising:
   a plurality of image scanning units that read image information pieces of different colors at positions shifted from each other in a fast scanning direction or a slow scanning direction;
   a selection unit, connected to a color image generation unit and a black-and-white image generation unit, that selects color image information generated by the color image generation unit or black-and-white image information generated by the black-and-white image generation unit as the image information to be employed, based on the read image information;
   wherein the color image generation unit generates color image information by assigning a plurality of the image information pieces read by the image scanning units, arranged to read different positions of an object in the slow scanning direction, to the same position;
   wherein the black-and-white image generation unit generates black-and-white image information by assigning the plurality of image information pieces read by the image scanning units to positions different from each other.

2. The image scanning apparatus according to claim 1, wherein the image scanning units include:
   R-image scanning means for reading Red-color image information;
   G-image scanning means for reading Green-color image information at a position different from that of the R-image scanning means in a slow scanning direction; and
   B-image scanning means for reading Blue-color image information at the position different from those of the R-image scanning means and the G-image scanning means in the slow scanning direction, wherein those image scanning means:
   perform slow scanning directional scanning at such a speed that a fast scanning directional resolution is three times a slow scanning directional resolution in the color image information generated by the color image generation unit; and
   further comprising a resolution conversion unit that performs resolution conversion by tripling the slow scanning directional resolution for the color image information generated by the color image generation unit.

3. The image scanning apparatus according to claim 2, wherein the selection unit identifies an image region of a black-and-white character or line drawing based on the read Red-color image information, Green-color image information, or Blue-color image information and selects black-and-white image information generated by the black-and-white image generation unit for the identified image region of the black-and-white character or line drawing.

4. The image scanning apparatus according to claim 2, wherein the selection unit generates the image information of a YCC color space based on the read Red-color image information, Green-color image information, and Blue-color image information, identifies an image region of a black-and-white character or line drawing based on the generated YCC color space image information, and selects black-and-white image information generated by the black-and-white image generation unit for the identified image region.

5. The image scanning apparatus according to claim 2, wherein shifts in scanning positions in the slow scanning direction by the R-image scanning means, G-image scanning means, and B-image scanning means are roughly equally spaced.

6. The image scanning apparatus according to claim 2, wherein the black-and-white image generation unit converts the Red-color image information into a white/black image at a first scanned position, converts the Green-color image into a white/black image at a second scanned location, and converts the Blue-color image into a white/black image at a third scanned location;
    wherein the first scanned position, second scanned position, and third scanned position are different from each other.

7. A non-transitory computer-readable medium storing thereon a computer program used in a computer, the computer program causing the computer to function as:
    an image acquisition function to acquire image information pieces of a plurality of colors read by a plurality of image scanning units at positions shifted from each other in a fast scanning direction or a slow scanning direction;
    a selection function to select color image information generated by a color image generation function or black-and-white image information generated by a black-and-white image generation function as the image information to be employed, based on the acquired image information;
    wherein the color image generation function generates color image information by assigning the acquired image information pieces of the plurality of colors read by the image scanning units, arranged to read different positions of an object in the slow scanning direction, to the same position;
    wherein the black-and-white image generation function generates black-and-white image information by assigning the plurality of image information pieces acquired to positions different from each other.

8. An image scanning method comprising:
    an image scanning step of reading image information pieces of different colors read by a plurality of image scanning units at positions shifted from each other in a fast scanning direction or a slow scanning direction;
    a selection step of selecting color image information generated at a color image generation step or black-and-white image information generated at a black-and-white image generation step as the image information to be employed, based on the read image information;
    wherein, when the color image generation step is selected, generating color image information by assigning a plurality of the image information pieces read at the image scanning step by the image scanning units, arranged to read different positions of an object in the slow scanning direction, to the same position;
    wherein, when the black-and-white generation step is selected, generating black-and-white image information by assigning the plurality of image information pieces read at the image scanning step to positions different from each other.

\* \* \* \* \*